United States Patent [19]
Boozer

[11] Patent Number: 5,348,359
[45] Date of Patent: Sep. 20, 1994

[54] RETRIEVER TOOL WITH INTERCHANGEABLE ACCESSORIES

[75] Inventor: James J. Boozer, Phoenix, Ariz.

[73] Assignee: Sportlite/Powermag, Phoenix, Ariz.

[21] Appl. No.: 10,882

[22] Filed: Jan. 29, 1993

[51] Int. Cl.⁵ .............................. B25J 1/02; B25J 15/04
[52] U.S. Cl. .................................. 294/24; 294/19.1; 294/65.5
[58] Field of Search ...................... 294/1.2, 2, 3, 19.1, 294/22–24, 64.1, 65.5, 66.2, 88, 116; 335/285, 289–291, 293; 362/102, 109, 119, 120, 253

[56] References Cited

U.S. PATENT DOCUMENTS

| | | | |
|---|---|---|---|
| 1,521,173 | 12/1924 | Catching | 294/65.5 |
| 1,772,126 | 8/1930 | Barry | 294/65.5 X |
| 1,989,443 | 1/1935 | Arnold | 294/66.2 |
| 2,803,484 | 8/1957 | Puckett | 294/19.1 X |
| 3,582,638 | 6/1971 | Peters | 294/65.5 X |
| 3,924,115 | 12/1975 | Hampton et al. | 294/65.5 X |
| 4,253,697 | 3/1981 | Acosta | 294/65.5 X |
| 4,466,649 | 8/1984 | Ozawa | 294/19.1 |
| 4,527,824 | 7/1985 | Rosenfeld | 294/19.1 X |
| 4,711,482 | 12/1987 | Brown et al. | 294/19.1 |
| 4,827,956 | 5/1989 | Toot | 294/65.5 X |

Primary Examiner—Johnny D. Cherry
Attorney, Agent, or Firm—Gregory J. Nelson

[57] ABSTRACT

An electromagnetic pick-up retriever tool having a number of interchangeable accessories to assist in locating, illuminating, viewing and retrieving both magnetic and non-magnetic objects such as small mechanical parts. The tool has a pistol-like handle which contains the power source and circuitry and which has a receptacle which selectively receives various attachments such as a bendable/reformable wand having an electromagnet at the end. Illuminating lights and fiber optic viewers may be selectively attached to the device.

18 Claims, 4 Drawing Sheets

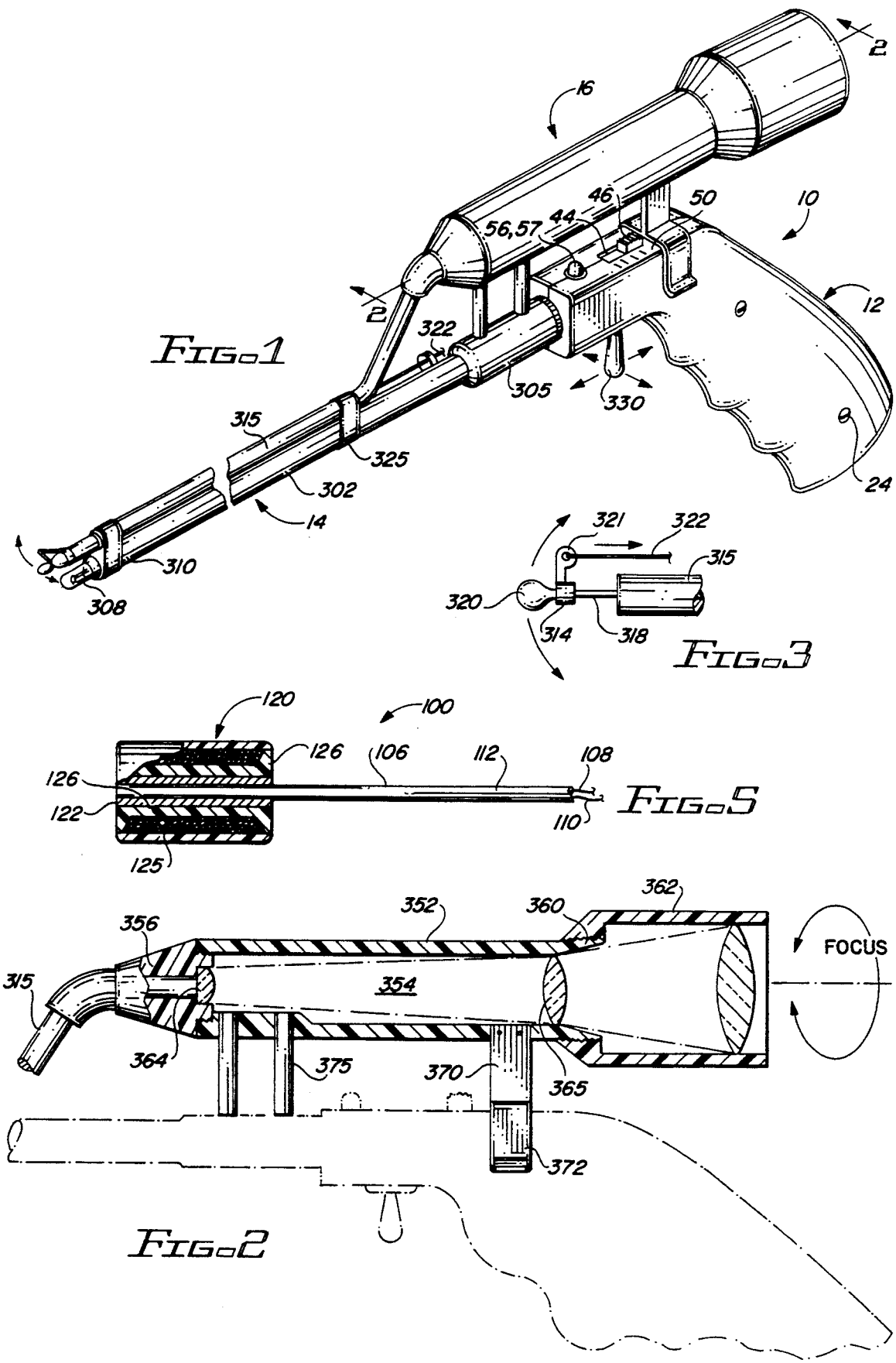

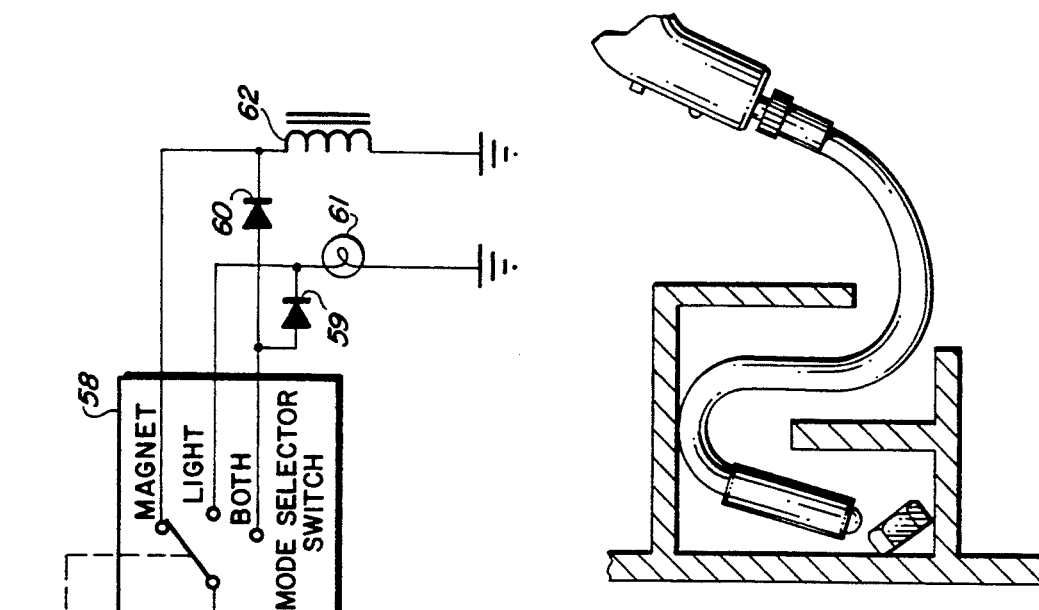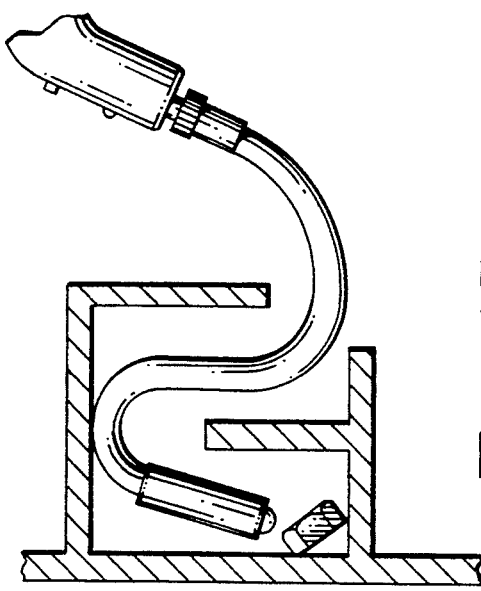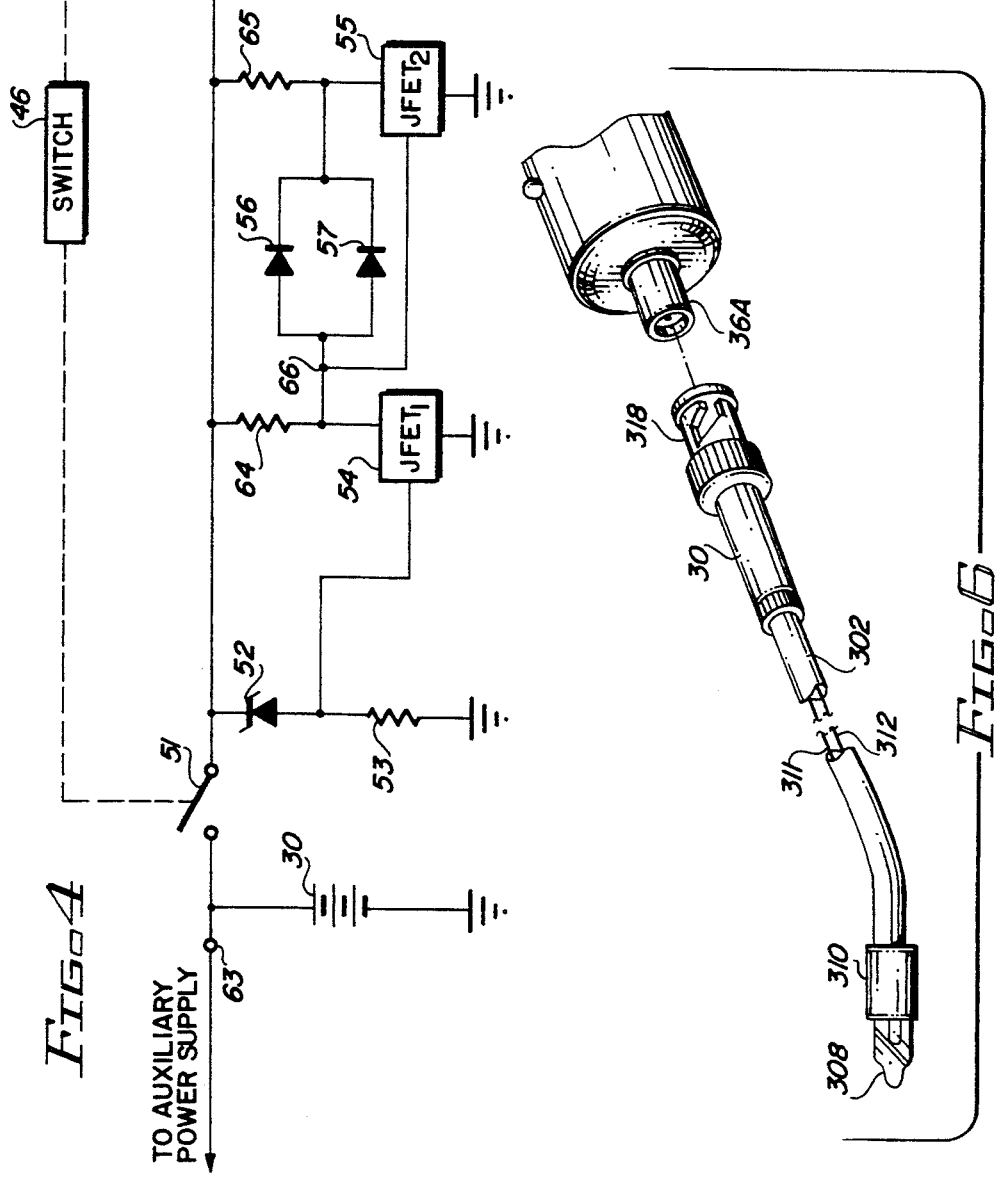

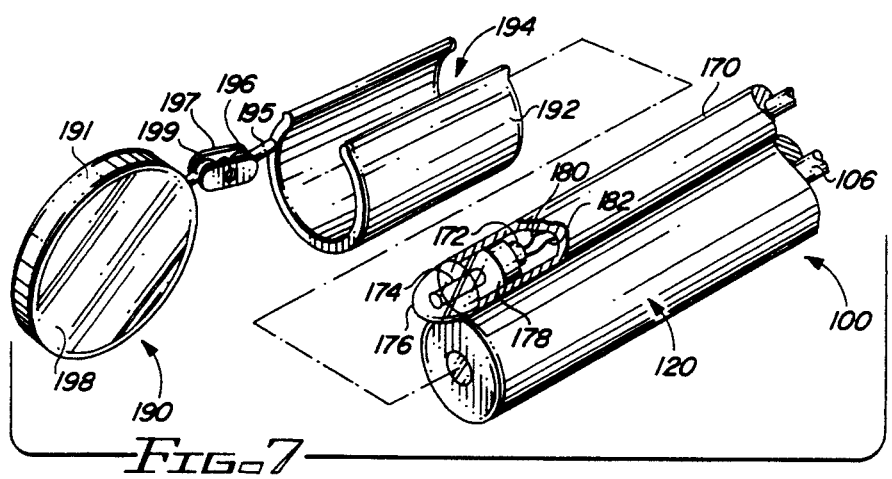
FIG-7
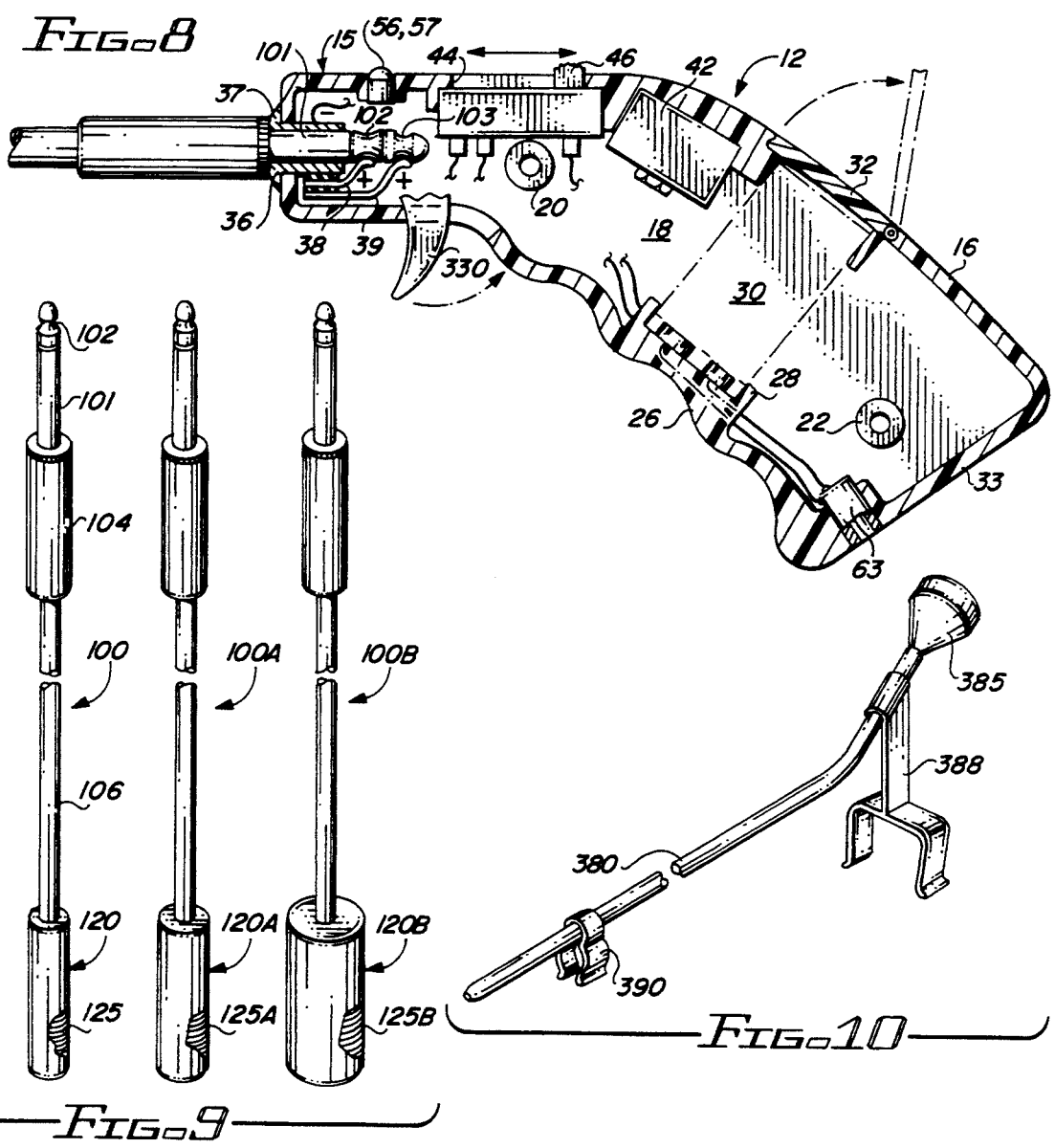
FIG-8
FIG-9
FIG-10

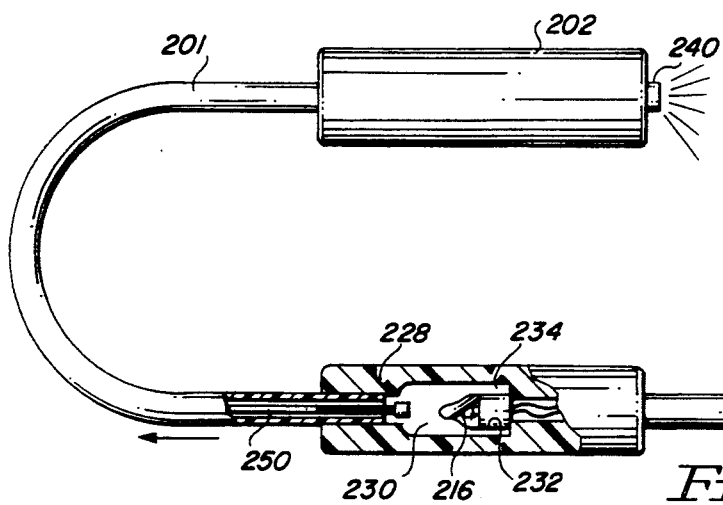
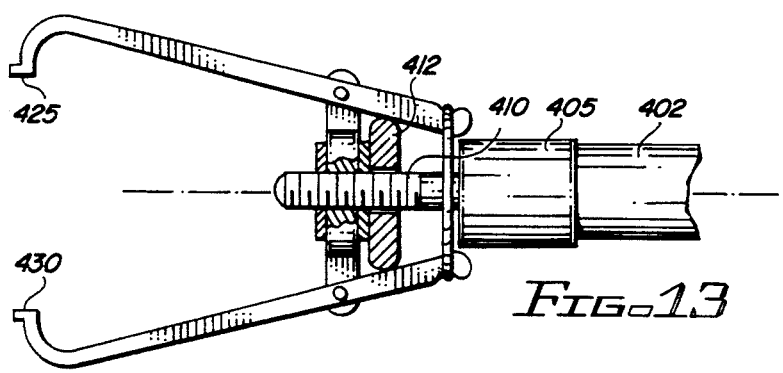
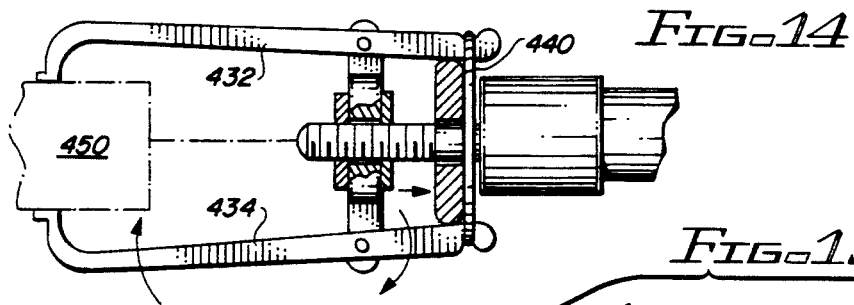
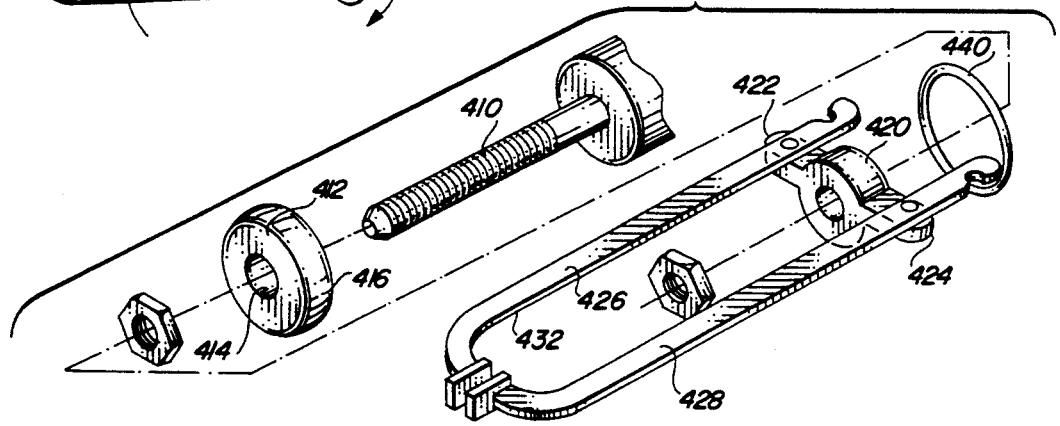

RETRIEVER TOOL WITH INTERCHANGEABLE ACCESSORIES

The present invention relates to a hand-held retriever tool for assisting the user in illuminating, locating and engaging objects from hard-to-reach areas. More specifically, the device relates to a tool for use by mechanics and others, which tool has a handle housing a power source to which various accessories, such as electromagnets, lights, fiber optic viewers or other pick-up devices can be selectively attached at the end of a bendable wand.

It is quite common when making repairs for small parts or pieces to fall into relatively inaccessible places which makes retrieval difficult. This often occurs to mechanics involved in the maintenance and repair of vehicles, appliances and other equipment. For example, automobile mechanics often encounter difficulties in retrieving parts such as small nuts, washers, bolts or springs which fall into remote portions of the engine or engine compartment and retrieval is difficult as the parts are in a location obstructed from view and which does not permit the mechanic access to manually grasp the part. Because of this problem, there are various specialty retrieval tools in the prior art adapted for use by mechanics.

For example, U.S. Pat. No. 1,535,618 shows a flexible electromagnet which may be bent in any desired shape to enable it to be introduced into inaccessible places to allow the user to enable the end of the magnet to reach objects which cannot otherwise be reached.

U.S. Pat. No. 1,772,126 discloses an automobile electromagnetic specialty tool primarily for use in garages which tool has a flexible shank containing electrical conductors attached to a single pole electromagnet having an adjustable fishing head and which is selectively connectable to a power source.

U.S. Pat. No. 2,993,723 discloses a magnetic retriever having a resiliently flexible shaft with a permanent magnet at one end so the retriever may be inserted through the dipstick passage into the crank case of an engine to reach metallic objects inadvertently dropped into the crank case.

U.S. Pat. No. 3,924,115 shows a portable hand-held device for locating and retrieving objects which has a source of electrical current controllable to energize a light source and an electromagnet. The electromagnet is disposed at one end of a flexible member or gooseneck which is connected to a hand-held device adjacent the light source. Optical fibers within the flexible member transmit light from the light source to the end of the flexible member.

Another type of retriever is shown in U.S. U.S. Pat. No. 4,253,697 in which a tool is disposed having a snap-lock handle connected to one end of a flexible cable. The other end has a releasable gripping end which may be mechanically or electromagnetically operated. A viewing system utilizes fiber optics.

While the devices described above and other similar devices which can be found in the prior art provide improved pick-up devices, there nevertheless exists a need for a device of this type which is simple in construction, efficient and versatile to use and which provides the user with a selection of interchangeable accessories for illuminating, viewing and retrieving both magnetizable and nonmagnetizable objects from hard-to-reach locations.

Briefly, the present invention provides a retriever or pick-up tool which is provided with a number of interchangeable accessories to assist in locating, illuminating, viewing and retrieving both objects which are magnetically attractable and those which are not. The device of the present invention has a handle with a pistol-like grip configuration which handle contains the power circuit, power source, on/off switch and is provided with a receptacle for selective attachment of accessory tools of various types. One accessory tool has an electromagnetic device at the tip of a bendable, formable elongate shaft or wand with a jack at the opposite end receivable within the receptacle of the handle. The electromagnet is energized when the actuating switch is actuated connecting the electromagnet to the power source. A lamp may be mounted near or at the end of the electromagnetic tool. The electromagnetic accessory tool may be provided in different lengths and with electromagnets having various field strengths for retrieving objects of various sizes and weights. Another optional accessory tool is an elongate wand having a lamp at the end which may be used with a fiber optic viewing device which is selectively attachable to the device. The viewing device may be selectively focused to view an object illuminated at or near the end of the tool by the lamp.

As an alternate illumination arrangement, the lamp may be located at the handle and light transmitted to the end of the wand by a fiber optic tube extending along the wand. The fiber optic tube may also be utilized to transmit the image rearwardly from the end of the wand to be viewed at a magnifying lens. The lens at the end of the fiber optic tube may be manually moveable by the user at a trigger to provide an increased field of view. An attachable reflector or mirror may also be securable to the end of the wand to assist in visually locating an object. Non-magnetically attractable objects are retrievable by a magnetically actuated pick-up device having closable jaws.

Accordingly, it is a broad object of the present invention to provide a tool as described above for illuminating and retrieving both magnetic and nonmagnetic objects with a hand-held unit which is extremely versatile and adaptable to selectively receive a number of accessory tools.

The above and other objects and advantages of the present invention will become more apparent from the following description, claims and drawings in which:

FIG. 1 is a perspective view of a preferred form of the retriever device of the present invention showing the handle, light and viewer;

FIG. 2 is a sectional view taken along line 2—2 of FIG. 1 showing the viewer;

FIG. 3 is an enlarged detail view of the distal end of the image transmitting fiber optic tube shown in FIG. 1;

FIG. 4 is an electrical schematic of the electrical circuit;

FIG. 5 is a detail view of the end of an alternate accessory tool usable with the device of the present invention:

FIG. 6 is a perspective view of an accessory tool having a light at its distal end;

FIG. 7 is a perspective view of the end of an accessory tool shown with a detachable viewing mirror;

FIG. 8 is a cross-sectional view of the hand-held grip and a portion of the receptacle shown with the various accessory tools;

FIG. 9 is a perspective view illustrating several optional accessory tools, each having an electromagnet associated therewith; and FIG. 10 is a perspective view of a detachable viewer;

FIG. 11 is a view partly in section of the inner end of a fiber optic light accessory tool;

FIG. 12 is a view illustrating an extension tool shown with an accessory tool;

FIGS. 13 to 15 illustrate an accessory tool for retrieving non-magnetic objects; and FIG. 16 illustrates the device in use.

Turning now to the drawings, particularly FIGS. 1 and 8, a preferred embodiment of the present invention is generally designated by the numeral 10 and consists of two principal components including a handle 12 and an elongate accessory tool 14 which may be of various types, as will be explained. The accessory tool may be a light, a magnetic device or a non-magnetic device. The term "retriever" is used to encompass all such accessories. An optional detachable viewer 16 is also shown mounted on the handle and having a light transmitting fiber optic tube extending along the tool 14.

The handle 12 is shown in cross-section in FIG. 8 and is preferably molded from a suitable impact-resistant material such as ABS plastic. The handle has an upper main body 15 and a depending grip 16 which define a hollow interior compartment 18. Preferably, the handle, as indicated, is molded in two mating half sections. Each section of the handle includes internal bosses 20 and 22 which, when the handle is assembled, abut so that the handle sections may be joined at the bosses by suitable mechanical fasteners 24 by adhesive or by other known bonding techniques such as welding.

The rear or back side of the grip 16 is smoothly curved as shown in FIGS. 1 and 8 and the forward or front of the grip has a plurality of recesses 26 configured to receive the fingers of the user, somewhat similar to a conventional pistol grip. A bottom or butt 33 is provided at the lower end of the grip. Internal compartment 18 includes a recess 28 which is adapted to receive a conventional power source such as a 9 volt battery 30, as shown in dotted lines. Access to the compartment 18 is via battery access door 32 which is hingedly secured to the grip 16. Alternatively, the battery access door may be provided in the butt end 33 of the grip. The handle has a general pistol grip configuration and it is an important aspect of the invention that the handle grip 16 is not axially aligned with the accessory tool as this arrangement provides significant advantages of operation facilitating ease of use and manipulation.

The forward end of the housing section 15 defines an axially extending receptacle 36 which is adapted to receive various tool accessories as will be explained hereafter. The receptacle is shown as an insert or plug-type jack or may be a twist-lock or other type of releasable connector. The receptacle includes a conductor 37 which serves as a contact for the electrical circuit contained in the handle, as will be explained. One or more electrically conductive spring retaining members 38 and 39, shown as springs, are adapted to retainingly engage the particular accessory tool inserted into the receptacle located in the handle.

A circuit board 42 is mounted within compartment 18 and contains the circuitry for the various electrical circuits such as the battery test circuit, the power circuit, and the switching circuit. The details of the circuitry will be described hereafter with reference to FIG. 4. The upper portion of housing section 15 defines a slot 44 which is best seen in FIG. 1. The slot 44 receives a slide member 46 which operates a multi-position mode selection switch 58, as seen in FIGS. 1 and 4, which allows the user to turn the device on and select the desired operational mode with either the accessory light on, the accessory electromagnet on, or both the light and the electromagnet on. Operation of the slide from the off position to a selected mode position will also close the off/on switch 51. Indicia 50 are appropriately provided on the upper surface of the handle adjacent the slide indicating for example "Off", "Light", "Magnet" and "Both". Forward of the slide switch are LED's 56, 57 which are located in the battery test circuit and which indicates a low battery condition.

The electrical circuitry is shown in FIG. 4. The desired operational mode is selected by operation of slide 46. The circuit is shown in single-ended form with battery 30 coupled through switch 51 to a pair of light-emitting diodes 56, 57 which are used to indicate the level of the battery voltage. The diodes are reversely connected in parallel between the source electrodes of JFET's 54 and 55. The source electrodes are coupled through corresponding resistors 64 and 65 to the battery 30 through switch 51. Each diode emits light of a different color when current is passed through. As shown, only one diode is conducting at a particular time.

The first JFET 54 has its gate electrode coupled to the connection of Zener diode 52 and resistor 53. When the voltage at switch 51 exceeds a predetermined level, the diode 52 becomes conductive and a signal is applied to the gate of JFET 54 causing a voltage drop at terminal 66 which reduces the signal at the gate electrode of JFET 55. In this manner, the light-emitting diodes 56, 57 alternate their conductive states. As the voltage at switch 51 drops, diode 52 becomes nonconductive and the signal at the gate electrode of JFET 54 is terminated while a signal appears at the gate electrode of JFET 55. As a result, the state of the battery 30 is indicated by the color light emitted by the conducting diode of diode pair 56, 57. The current requirements of the JFET transistors, typically ZN7000 devices made by Motorola, Inc., are low thereby limiting the current drain on the battery. It should be noted that an auxiliary power supply such as a transformer-rectifier combination can be coupled to terminal 63 to permit connection to a standard 60 Hz household circuit. Alternatively, the terminal 63 may be connected to a remote source such as a vehicle electrical system through the cigarette lighter, or connected to the vehicle battery, as is known. Typically, with a 9 volt source, a low power indication will be given if the available power drops below 3 volts.

Moving slide 46 will close switch 51 to couple mode selector switch 58 to the power source. The selector switch 58 has three output terminals, each corresponding to a single operating mode as described above. In the first mode, the battery voltage is applied to an electromagnet 62 which when energized will attract magnetically attractable objects. In the second mode, the lamp 61 is energized while in the third mode both the electromagnet 62 and lamp 61 are supplied with current flowing through on-off switch 51. Diodes 59., 60 are provided to limit current flow in the reverse direction in the third mode of operation. Plug 63, as has been explained, is connectable to an auxiliary power source such as an adapter connected to a 110 AC outlet. In this case, the circuit connected to battery 30 is bypassed.

The present invention includes various accessory tools which are detachably securable to the handle, as for example, FIG. 9 illustrates electromagnetic tools designated by the numerals 100, 100A and 100B. Electromagnetic tool 100 is representative and has jack 101 which has a generally elongate, cylindrical body and is insertable in receptacle 36. The inner or proximal end of the jack has an annularly extending groove 102 which is positioned to be engaged by spring 38 to retain the tool in place, as best seen in FIG. 8. A cylindrical stop 104, which may be in the form of a plastic sleeve, is positioned immediately adjacent the jack to facilitate insertion of the prong to the proper engagement depth. The magnetic device shown in FIG. 9 is used for retrieving magnetically attractable items from difficult-to-reach locations such as in a recess in an automotive engine compartment.

The electromagnetic pick-up accessory tool 100 includes an elongate body 106 which is termed a "wand" and which is relatively stiff for supporting an article during retrieval but also has the characteristic of being flexible or bendable so that the device may be configured to depend into hard-to-reach locations. FIG. 16 illustrates the device in use and is representative of use with any type of retriever such as a magnet or a light. Accordingly, in a preferred embodiment 100 as seen in FIG. 5, the elongate wand 106 is fabricated having a pair of conductors 108 and 110 suitably insulated with a protective covering. A centrally disposed member 112 of copper wire such as 10 or 12 ga. provides both the necessary rigidity and bendability required. The inner or proximal ends of the conductors are connected to carry electrical current to the distal end of the tool. Accordingly, conductor 108, at its inner end, is in electrical contact with the receptacle and therefore serves as a negative terminal for the circuit shown in FIG. 4. Electrical conductor 110 is electrically connected to the annular recess 102 of the jack which is in contact with the positive terminal of the electric circuit shown in FIG. 4. The member 112 may be utilized as an electrical conductor in some cases.

Referring to FIG. 5, coaxially disposed around the distal end of the wand 106 is an electromagnet 120 which includes a core 122 of ferrous material. Coaxially disposed within the housing is electromagnetic coil 125 which consists of a plurality of windings wrapped about a spool 126. The electromagnetic coil is connected to conductors 108 and 110 and when energized will create a magnetic field about the end of the coil which will serve to attract magnetically attractable objects. When the mode selection switch 58 is placed in the "magnet" position and on/off switch 51 closed, the electric coil is energized by electrical current which flows from the power source through the switch in the wire to the electromagnetic coil. The electromagnetic field is established while the magnet is energized and may be used to attract magnetic objects to the electromagnet. The bendable, elongate wand 106 permits the magnet to be configured so it may be inserted into otherwise hard-to-reach places. The magnetic field remains energized until the object is withdrawn and is to be released from the magnet at which time switch 51 is opened. The wand is protected with an elastomeric or plastic sheath.

The weight of the object to be retrieved may require a stronger electromagnetic force than can be exerted by tool 100. Accordingly, electromagnetic pick-up tools 100A and 100B are provided with coils 125A and 125B, respectively, which have a greater number of windings in their associated electromagnetic coil so as to create a stronger electromagnetic field. For example, with a 9 volt power source, coil 125 may have sufficient windings to provide sufficient electromagnetic force to pick up from 0 to about 10 ounces, whereas coil 125A would have sufficient force to pick up about 16 ounces and coil 125B would exert a pick-up force of about 25 ounces. The user would select the appropriate tool in accordance with the weight of the object to be retrieved and insert the associated plug into the receptacle 36 of the handle 12. The construction of the accessory tool and the handle allow for easy attachment and removal of the selected accessory.

There will be situations where the length of the accessory tool is insufficient to reach into locations which contain an item to be retrieved. Typically the tools such as 100, 100A, and 100B will be approximately 12"–18" long. If additional reach is required, one or more extensions 150, as shown in FIG. 12, may be used with an accessory such as tool 100. Extension 150 has jack 152 at its inner end which is insertable into the receptacle of the handle of the device. Jack 152 has a cylindrical portion 154 which is connected to an internal conductor and an electrically isolated tip 156 which is connected to the other of the internal electrical conductors, not shown. The conductors extend through the body 162 of the wand and are connected at their distal end to a female receptacle 165 which is connectable with the positive and negative terminal portion of jack 101 of the selected tool 100. Thus, by interposing one or more of the extension members 150 between the selected tool 100 and the hand-held unit 10, the effective length of the retriever can be extended. The elongate body 162 of the extension tool is fabricated from a bendable or deformable material such as copper which allows both the tool and the extension device to be manually formed to the necessary shape to reach items in hard-to-reach locations.

One problem attendant to use of devices of this type is that the object to be retrieved is often located in a recess which is both difficult to reach and poorly lighted. Accordingly, the device of the present invention includes provision for illuminating the area at the tip of the retriever tool.

Referring to FIG. 7, the magnet end of tool 100 is provided with an axially extending housing 170 which has an internal socket 172 which receives bulb 174. A clear protective lens 176 is provided at the end of the housing. A reflector 178 which is shown as concave may be provided around the base of the bulb to direct the light emitting from the bulb outwardly through the lens. As seen in FIG. 7, conductor wires 180 and 182 extend along the wand 106 with one being connected to the negative contact portion 37 of the plug at the receptacle and the other conductor is connected to contact 102 of the jack and is engaged by the retaining spring 39 when the plug is inserted. In this way, the operator can selectively energize either the electromagnet, the light or both by means of the mode selection switch 58.

Further, as seen in FIG. 7, a mirror 190 may be detachably secured about the light housing on the body of the electromagnet 120 which mirror is provided to assist the user in both locating and retrieving the object. The mirror assembly includes a generally C-shaped clamp member 192 having an axially extending opening 194. The clamp 192 may be detachably engaged about the exterior of the body of either the electromagnet 120 or light housing 170. The clamp carries a forwardly extending pin 195 which terminates at a ball 196 which is receivable within a socket of universal joint 197. A mirror assembly includes a reflective surface 198 received within a generally peripherally extending housing 191. The housing 191 is pivotally attached to the universal joint at ball 199.

It will be appreciated that when the mirror 190 is attached at the end of the tool at the electromagnet, the position of the mirror relative to the end of the tool may be adjusted through a wide range of positions at joint 197. The mirror may be used in conjunction with the light bulb 174 to reflect light to a desired location and also to allow the user to better visually inspect a remote location.

Light may also be transmitted to the distal end of the tool by use of fiber optics. Referring to FIG. 11, an alternate version of the retriever wand is shown. The tool has a bendable or deformable wand 201, the distal end of which is provided with an electromagnet 202 connectable to a source of electrical current at its proximal end at jack 205 as has been explained. The wand 201 is deformable and reformable and is shown as an axially extending tubular member of copper or other material suitably covered by a protective coating.

A cylindrical housing 228 is positioned immediately forward of the jack and serves as a stop and also defines a compartment 230 which has a socket 232 for receipt of a small lamp 216. The socket is electrically connected to the source of electrical energy via jack 205 and the electrical circuit and switches as described above. A conical reflector 234 may be provided at the base of the lamp to focusthe light emanating from the lamp forwardly toward the end of fiber optic member 250. Fiber optic member 250 extends axially through the wand 201 and through the center of the spool of the electromagnet 202 terminating at the distal end of the electromagnet at 240. The fiber optics tube will transmit light emitted from the lamp 216 to the end of the tool so light will be emitted from the center of the electromagnet to illuminate the area to be inspected. The light assists the user in both locating and maneuvering the retriever to the proper location for retrieval of an object.

In FIG. 1 the retriever device is shown having an accessory tool 14 of still another type which has an elongate wand 302 which is bendable. The wand is provided to provide illumination means which are shown in FIG. 6. The wand has a stop 305 at its inner end and has a jack 318 which is receivable within the receptacle at the forward end of the handle of the device. The illumination means include a lamp or bulb 308 receivable within a socket 310 at the outer end of the wand. The socket is hard wired by conductors 311 and 312 within the body of the wand to the jack 318 at the inner end of the wand as has been described. The jack may be inserted in the receptacle such as receptacle 36 described above. In FIG. 6 an alternative form of electrical receptacle 36A is shown which is of the type designated as BNC and manufactured by AMP, Inc. Alternatively, the illumination may be provided by light transmitted through a fiber optic tube as has been described with reference to FIG. 11. Illumination is provided at the end of the tool to assist the user in visually locating the part and the illumination source may be easily directed by the user by manipulation of the handle. The "pistol-like" configuration of the device is particularly convenient providing the user stability, flexibility and "sighting" or "aiming" of the light using the barrel-like wand.

With the embodiment as shown in FIGS. 1 and 3, an optional removable viewer 16 is shown as being mounted on the device. The viewer includes an elongate cable-like body 315 which is flexible and which internally houses optical fiber tube 318. Optical fiber tube 318 extends from the end of the tool a predetermined distance terminating at lens 320. Optical fiber 318 is flexible and a small collar 314 is attached to a portion of the optical fiber extending from the end of the wand 315. The collar is attached to a crank arm 321 to which is attached control wire 322 which extends along the side of the light transmitting tube 315 in suitable guides to an inner end which is located adjacent the grip. Manipulation of the control wire by means of trigger 330 will move the position of the lens 320 so that the user may, by manipulating the position of the lens, inspect an area at the end of the tool while maintaining the tool stationary. The fiber optic tube 318 is secured to the body 315 of the wand by a plurality of detachable clips 325 which having spring-like characteristics and may be made of plastic or similar material.

The fiber optic tube 318 transmits images viewed at the lens 320 to the viewer 16 which is seen in detail in FIG. 2 and includes a generally cylindrical 20 body member 352 defining an interior chamber 354. The forward end of the tube 352 terminates at a cap 356 which receives the distal end of the optical fiber 315. The opposite end of the tube 352 is in threaded engagement at 360 with eye piece 362. An objective lens 364 is positioned immediately adjacent the end of optical tube. As is known in the telescopic arts, one or more intermediate lenses 365 are provided in the tube and eye piece 362 includes a focusing lens 366. Rotation of the eye piece will serve to focus the image transmitted via the optical fiber.

The viewer is detachably securable to the handle by means of downwardly depending clamp 370 having opposite spring arms 372 which are adapted to frictionally engage the upper portion of the handle. Depending posts 375 further assists in supporting the viewer in a position above the grip whereby the viewer may easily hold the viewer at eye level for convenient use. Again, the overall configuration of the handle and light wand provide for stability and easy maneuverability. The addition of the viewer allows the user to view objects at or near the end of the viewer at the eye piece.

An alternate viewer is seen in FIG. 10 which has a fiber optic tube 380 with a single lens viewer 385 at its proximal end. Clips 388 and 390 detachably secure the viewer to the top of the handle and wand.

In some instances, it may become difficult to retrieve an object with the electromagnet due to the size, shape, material or position of the object to be retrieved. Accordingly, the retriever of the present invention may be equipped with an accessory claw device for the purpose of engaging the object to be retrieved. Referring to FIGS. 13, 14 and 15, the distal end of a retrieving accessory is shown. The device again has an elongate wand-like body 402 which at its proximal end has a jack, not, shown, which is insertable in the receptacle in the forward end of the handle to be secured to the handle and placed in an electric contact with the power source via the electrical circuitry as has been described with reference to FIG. 4. The distal end of the wand carries an electromagnet 405 which, as has been described above, has a spool with a plurality of electrical windings which when energized will exert electromagnetic field which will attract magnetically attractable objects with the greatest magnetic attraction exerted in the area of the end face of the electromagnet. Alternatively, the claw may simply have a sleeve which frictionally engages the electromagnet 120 of a wand such as that shown in FIG. 9.

A threaded shaft 410 extends axially from the end of the electromagnet and a magnetic disk 412 is slidable along the member 410 at central aperture 414. The disk 412 is of a ferrous or other magnetic material. The disk has a peripheral surface 416 which provides a camming action as will be explained more fully hereafter.

Positioned outwardly from the magnetic disk is an annular mounting ring 420 having oppositely extending flanges 422 and 424. A pair of oppositely disposed jaws 426 and 428 are respectively, pivotally mounted to the flanges 422 and 424. The jaws may be any suitable configuration but are shown as being generally elongate having oppositely disposed gripping surfaces 425 and 430. The inner surfaces 432 and 434 of the jaws are in engagement with the outer camming surface of the magnetic disk. The inner end of the jaws are held in a normally open position as shown in FIG. 15 by biasing member 440 which may be in the form of an elastomeric band.

When it is desired to grasp an object, the jaws are in the open position as shown in FIG. 13 and the electromagnet is in a non-energized condition. The opposite gripping surfaces 425 and 430 of the jaws are then placed about the object 450 and the electromagnet energized by closing on/off switch 51. Upon energization of the electromagnet, the magnetic disk 412 is magnetically attracted toward the electromagnet which causes the outer camming surface 416 of the disk to force the inner ends of the jaws outwardly causing the gripping members to come together into engagement with the object 450.

While maintaining the flow of current to the magnet with the switch 51 closed, the object grasped by the jaws may be extricated by withdrawing the retriever wand.

It will be obvious that the present invention provides a unique and highly adaptable and versatile retriever tool with which a number of various accessory items may be used.

It will be obvious to those skilled in the art to make various changes, alterations and modifications to the retriever tool described herein. To the extent such changes, alterations and modifications do not depart from the spirit and scope of the appended claims, they are intended to be encompassed therein.

I claim:

1. A mechanics retriever for locating and retrieving objects, said tool comprising:
    (a) a handle defining an internal compartment including a receptacle and a power circuit operatively connected to said receptacle;
    (b) a plurality of interchangeable accessory tools including at least an accessory tool having an elongate flexible and deformable and reformable wand member with a jack at its inner end detachably securable in said receptacle and having electrically operated retriever means at its opposite outer end, said accessory tool member extending axially from said receptacle in a non-deformed position; and
    (c) said handle including a grip adapted to be manually grasped by the user, said grip being disposed at an angle with respect to the non-deformable section of the wand whereby said retriever means may be selectively engaged in said receptacle at said jack and energized to assist the mechanic in manually locating and retrieving objects.

2. The retriever of claim 1 wherein said retriever means comprises light means.

3. The retriever of claim 2 wherein said light means includes a lamp at the outer end of said wand.

4. The retriever of claim 3 further including viewer means disposed on said handle and a transmitting means extending along said wand to transmit images from the outer end of said wand to said viewer means.

5. The retriever of claim 4 wherein said viewer means includes focus-adjusting means.

6. The retriever of claim 2 wherein said light means includes a lamp located adjacent the inner end of said wand and a light transmitting tube extending along said wand transmitting light to the outer end thereof.

7. The retriever of claim 2 further including reflector means detachably securable at the outer end of said wand.

8. The retriever of claim 1 wherein said retriever means comprises an electromagnet.

9. The retriever of claim 1 wherein said grip has a curved rear and front surface defining a pistol grip-like configuration.

10. The retriever of claim 9 wherein said front surface has a plurality of finger-receiving recesses.

11. The retriever of claim 9 wherein said power circuit includes a battery and said power circuit being selectively connectable to an auxiliary power source and further including indicator means for indicating low battery voltage.

12. The retriever of claim 11 wherein said indicator means comprises first and second light emitting diodes having alternate conducting states whereby a predetermined voltage drop will cause said first light emitting diode to become de-energized and said second light emitting diode to become energized, said light emitting diodes emitting distinguishable light signals.

13. The retriever of claim 1 wherein said wand includes an electrical conductor which is bendable and further including an outer insulative sheath.

14. The retriever of claim 1 further including at least one extension means interposable between said accessory tool and said handle and including means for electrically connecting said tool to said receptacle.

15. The retriever of claim 1 wherein said retriever means comprises an electromagnet, claw means having jaw means and a magnetic attractable cam engaging said claw means and upon energization of said electromagnet to close said jaw means.

16. The retriever of claim 15 wherein said jaw means are normally biased to an open position.

17. A mechanics retriever for locating and retrieving both metallic and non-metallic objects from difficult-to-reach locations, said tool comprising:
    (a) a handle having an upper body portion and an angularly extending grip, said grip being configured in a pistol-like configuration, said handle defining an interior compartment;
    (b) a receptacle in said body portion;
    (c) a power circuit disposed in said handle and having an actuating switch and connectable to a power source to provide power to said receptacle; and
    (d) a plurality of interchangeable accessory tools including at least an accessory tool having an elongate, flexible, deformable and reformable wand with connector means at the inner end detachably securable at said receptacle and having an electrically operated retriever means at the outer end, said retriever means being in selective electrical connection with said circuit across said switch when said connector means is secured in said receptacle.

18. The retriever tool of claim 17 wherein said interior compartment defines a battery storage area and said grip defines an access door to said interior compartment.

* * * * *